US006977995B1

(12) United States Patent
Gawande et al.

(10) Patent No.: US 6,977,995 B1

(45) Date of Patent: Dec. 20, 2005

(54) NETWORK HAVING SPACE CHATTERING CONTROL FOR MAXIMIZING CALL THROUGHPUT DURING OVERLOAD

(75) Inventors: Mohan Gawande, Cranbury, NJ (US); Daniel T. Luan, East Brunswick, NJ (US); Mark A. Ratcliffe, Oakhurst, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 10/974,498

(22) Filed: Oct. 27, 2004

Related U.S. Application Data

(63) Continuation of application No. 10/262,774, filed on Oct. 2, 2002, now Pat. No. 6,829,338.

(51) Int. Cl.[7] .............................................. H04M 15/00

(52) U.S. Cl. ............................. 379/112.1; 379/112.04; 379/112.06; 379/133; 379/139

(58) Field of Search ...................... 379/112.01, 112.04, 379/112.05, 112.1, 133–134, 138, 141, 221.03, 379/221.07, 221.09, 139–140, 111, 137, 112.06, 379/112.08

(56) References Cited

U.S. PATENT DOCUMENTS

| | | | |
|---|---|---|---|
| 4,991,204 A | 2/1991 | Yamamoto et al. | |
| 5,067,074 A | 11/1991 | Farel et al. | |
| 5,268,892 A | 12/1993 | Livanos | |
| 5,425,086 A | 6/1995 | Hidaka et al. | |
| 5,500,889 A | 3/1996 | Baker et al. | |
| 5,513,257 A | 4/1996 | Yoo et al. | |
| 5,539,815 A | 7/1996 | Samba | |
| 5,548,533 A | 8/1996 | Gao et al. | |
| 5,574,770 A | 11/1996 | Yoo et al. | |
| 5,715,395 A | 2/1998 | Brabson et al. | |
| 5,825,861 A | 10/1998 | Hoy | |
| 5,878,224 A | 3/1999 | Smith | |
| 5,892,818 A | 4/1999 | Lee | |
| 5,933,481 A | 8/1999 | MacDonald | |
| 5,943,232 A | 8/1999 | Gehi et al. | |
| 6,084,892 A | 7/2000 | Benash et al. | |
| 6,160,875 A | 12/2000 | Park et al. | |
| 6,259,776 B1 * | 7/2001 | Hunt | 379/114.01 |
| 6,570,855 B1 | 5/2003 | Kung et al. | |

OTHER PUBLICATIONS

Farel, Richard A. and Gawande, Mohan, "Design and Analysis of Overload Control Strategies for Transaction Network Databases" AT&T Bell Laboratories, *Proc. 13th Int. Teletraffic Congress*, Copenhagen, Denmark, Jun. 1991, pp. 115-120.

* cited by examiner

*Primary Examiner*—Binh K. Tieu

(57) ABSTRACT

A network includes a space chattering mechanism for maximizing server throughput under overload conditions. The server provides control messages to various network traffic sources, which can require differing control instructions.

7 Claims, 2 Drawing Sheets

NETWORK HAVING SPACE CHATTERING CONTROL FOR MAXIMIZING CALL THROUGHPUT DURING OVERLOAD

CROSS REFERENCE TO RELATED APPLICATION

This is a continuation of allowed parent application Ser. No. 10/262,774, filed Oct. 2, 2002, now U.S. Pat. No. 6,829,338 which is incorporated herein by reference in its entirety.

STATEMENT REGARDING FEDERALLY SPONSORED RESEARCH

Not Applicable.

FIELD OF THE INVENTION

The present invention relates generally to communication networks and, more particularly, to communication networks having servers for servicing traffic sources.

BACKGROUND OF THE INVENTION

Telecommunication networks having various switches and routers for making connections over the network are well known in the art. As is also known, a centralized database or application server can form a part of many communication networks. For example, in the AT&T Public Switched Network, a database system known as Segmentation Directory (SD) is used to process a query for successful completion of practically every call received in the network. Other instances of centralized servers include Network Control Points (NCPs) for providing various call setup and processing tasks, such as number translation, routing, authentication, billing and security. In Internet Protocol (IP) networks, centralized servers are essential parts of many Web services. Because of their role in providing service, it is often imperative that these servers function at their rated capacity at all times.

In general, a server receives queries or service requests from several Traffic Sources (TS). After successfully processing a query, the server sends a response back to the TS. When a server receives more queries than its capacity in a given time period, its throughput drops and it is said to be in overload. The term overload can also be used loosely to describe a query load above an allowed level. This is the case, for example, for Dialed Number (DN) controls. Each number is assigned an allowed traffic level. When that level is exceeded, the DN is said to be in overload, and an overload control may be used to block some queries at the traffic sources.

There are several known strategies that are used to mitigate the effect of overloads. Duplicate server sites may be used for redundancy or load distribution. Excess queries may be discarded after they reach the server. However, this control strategy uses valuable server resources, and is generally used as the control of last resort, since server throughput and response time drop under overload. Most traffic sources have a timeout mechanism in which, after a fixed period, a query with no response is either resent to the server, or to another server, or is abandoned. Under server overload, the server throughput drops and the query response time is also delayed, resulting in time-outs, retrials, or abandonment of queries at the traffic source. Overload and subsequent retries at some traffic sources can cause the overload to feed on itself and spread to other traffic sources.

Another known control technique attempts to limit excess queries from reaching the server. Such preemptive control protocols have been developed in which an overloaded server requests the traffic source to restrict the query load sent to the server. A traffic source can restrict the number of queries sent to the server using a control mechanism. The control mechanism at the traffic source can have several discrete control levels that can be applied to restrict the traffic going to the server at different rates. In response mode, the server "responds" with a control message to the source of every query that is processed successfully by the server. The number of control messages in this mode is acceptable if the server throughput is moderate, but can rise substantially if the server capacity is high, causing a drop in server throughput and congestion in the signaling network. For servers with large throughput, the broadcast mode is preferred. In broadcast mode, the overloaded server "broadcasts" control messages to all traffic sources at a specified control interval. The effectiveness of controls in the response mode depends on the number of traffic sources. The larger the number of traffic sources, the longer it takes to control an overload since each source needs to send at least one query to the server in order to receive a control message. However, broadcast mode is effective almost immediately at all traffic sources with one broadcast.

In a further known control strategy, the control mechanism at the traffic source may be customized, as in case of several controls used in AT&T's networks, or may follow industry standards so that the control may work with traffic sources from several different vendors that follow the standard. Standard protocols allow flexibility in network operation and growth and permit interoperability with other network providers. However, standard protocols are designed to serve generic needs and may not offer the best solution for a specific application. For instance, only a limited number of control levels may be defined in the standards. This limitation can compromise the effectiveness of the control for specific applications. For example the server throughput may oscillate and may remain substantially below its rated capacity if only the standard control levels are used.

It would, therefore, be desirable to overcome the aforesaid and other disadvantages of known overload control mechanisms.

SUMMARY OF THE INVENTION

The present invention provides a network traffic overload control mechanism that utilizes space chattering to maximize server throughput under overload conditions generated by various classes of traffic sources. With this arrangement, network servers can provide throughput at or near rated capacity during overload by controlling loads from a plurality of traffic sources, which can have different control schemes. While the invention is primarily shown and described in conjunction with a network having servers for handling service requests, it is understood that the invention is applicable to networks in general in which it is desirable to service clients as efficiently as possible.

In one aspect of the invention, a method of controlling overload includes determining a traffic level generated by first and second classes of traffic sources and determining whether the traffic level is within a predetermined range. If the traffic is outside the range, a base control vector, which includes base control values for the classes of traffic sources, is computed from an ideal control driver, which would bring the traffic level within range. For each class, the base control value typically falls between two consecutive discrete control levels for the traffic sources. A chattering vector is then computed from the base control vector and the desired traffic level. For each class, the first and second subsets of the first class of traffic sources are derived based on the chattering vector. The first subset receives a first or low control and the second subset receives a second or high control, wherein the first and second controls correspond to discrete control levels for the class of traffic source.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
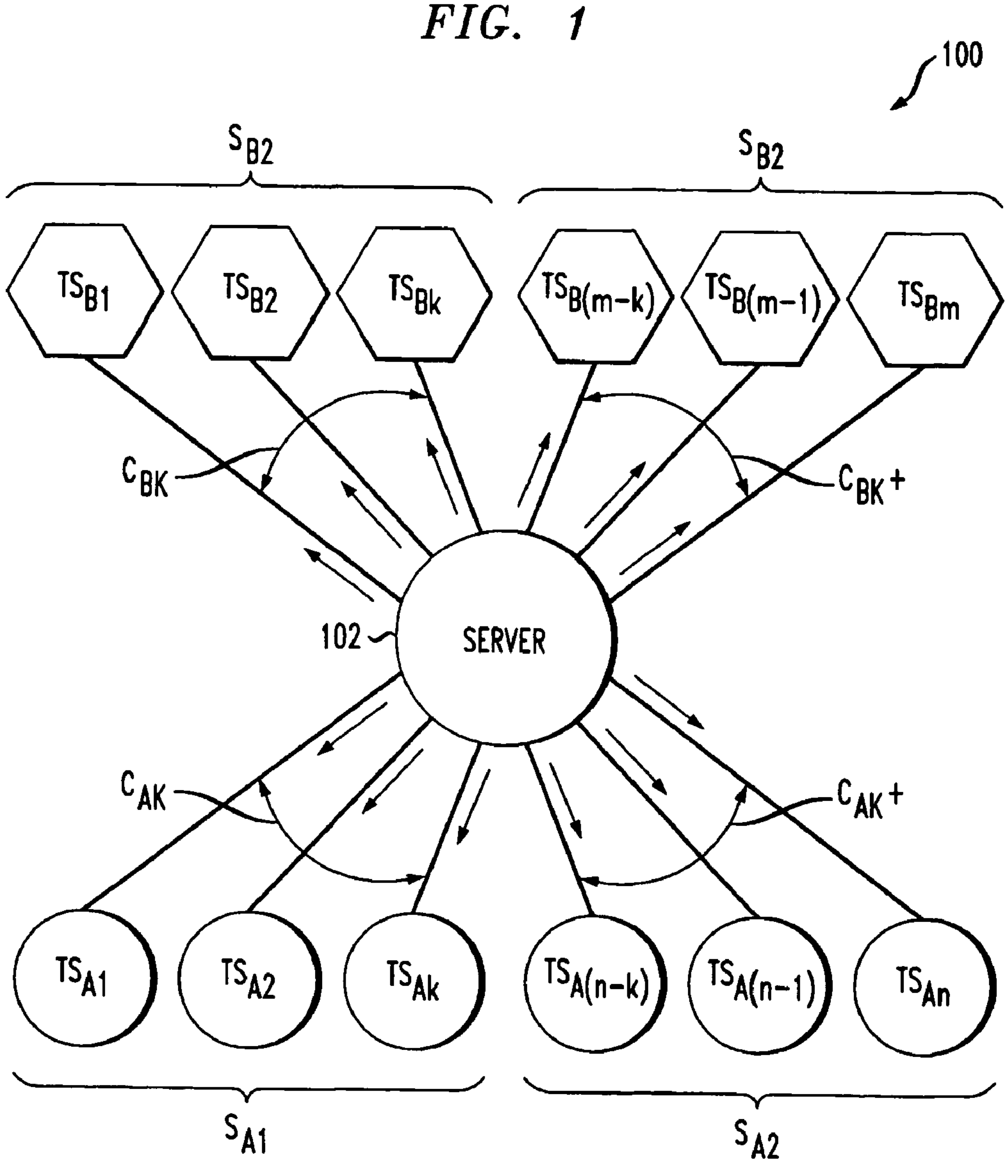
FIG. 1 is a schematic diagram showing an exemplary network having overload control in accordance with the present invention.

In general, the present invention provides a mechanism for controlling server overload to maximize overall throughput. The mechanism overcomes limitations associated with discrete control levels for various classes of traffic sources. The inventive space chattering scheme determines how various traffic sources, which can have standard controls, are controlled at specified times to maintain a desired traffic level and minimize congestion.

As is well known in the art, the throughput of most servers, as measured by the number of queries successfully processed over a period of time, can drop significantly when the server receives more query load than its capacity. In accordance with the present invention, excess queries are blocked at the traffic sources rather than letting the queries arrive at the server and then blocking them. This also maximizes server throughput under overloads.

Before describing further details of the invention, some introductory information is provided. Various telecommunication equipment manufacturers and network operators, such as AT&T, have developed different types of customized controls to optimize network performance. These proprietary controls are implemented in Lucent traffic source equipment, for example, and are relatively expensive to maintain and enhance. The AT&T implementation of the Automatic Code Gap (ACG) control is an instance of such control. For example, the Network Control Point databases in AT&T's network use the ACG control. This is a call gapping type control that is more fully described in U.S. Pat. No. 5,067,074, which is incorporated herein by reference. Appropriate gap levels and target codes are computed by an overloaded server and sent to traffic sources in the network. Upon receiving an ACG control message, the traffic source, after sending the next query to the server, blocks all subsequent queries to the server for the duration of the gap, after which another query is sent, and so on, until the control expires. The ANSI (American National Standards Institute) standard ACG implementation of this control specifies sixteen possible control levels in its gap table. One particular AT&T implementation permits sixty-four levels, allowing a finer control on the server throughput. The ACG control has been implemented in both response and broadcast modes in AT&T networks.

Some Network Control Points (NCPs) in AT&T's network use response mode, while the Segmentation Directories (SDs), due to their relatively large throughput, use the broadcast mode. One drawback of the broadcast mode is that a custom implementation of the ACG control developed for the response mode cannot be used. The response mode ACG control uses standard gap tables, but also uses a time-based chattering scheme (see U.S. Pat. No. 5,067,074) to effectively achieve intermediate gap values. In this scheme, a controlled mix of different gap values, typically two adjacent standard gaps, is sent to the traffic source at different times. This scheme is effective because a large number of control messages with different gaps is sent to different switches over the control interval and the effect of different gaps is averaged over time in the network. One AT&T implementation achieved equivalent sixty-four gap levels using sixteen standard gaps.

This scheme is relatively ineffective in the broadcast mode because fewer control messages are sent, most messages are sent in a batch over a short period of time, and effective averaging does not take place. To overcome this problem, the broadcast mode of the ACG uses an enhanced ACG table with sixty-four gaps, for example, which is implemented in Lucent 4ESS switches. However, this implementation of ACG is not compatible with industry standard switches.

In one aspect of the invention, a space chattering mechanism provides an implementation of the broadcast mode of ACG for servers that receive queries from traffic sources with the standard ACG table. This control scheme, which is referred to as space chattering control, overcomes the problems associated with the limited number of discrete control levels.

In general, the space chattering mechanism can support various types of control mechanisms associated with different classes of traffic sources in addition to call gapping. For example, the inventive space chattering scheme can be effective in the case of proportional control type traffic sources. In this control scheme, the server specifies a fraction by which the sending query traffic should be reduced. A number of vendor switches support this control. However, only a limited number of control levels are generally allowed. For example, only the fractions in increments of ⅛ may be allowed. This can limit the effectiveness of the control, and the server throughput can oscillate widely from the maximum. The inventive space chattering scheme can be used to specify a different control fraction to different traffic sources in order to achieve an effective intermediate fraction level, as described more fully below.

A third custom control mechanism in networks, such as AT&T networks, is Rate Based Control (RBC), which is based upon the token bank concept. The server computes and periodically sends a number of tokens to each traffic source that the traffic source "deposits" in a token bank. A query is allowed to proceed to the server if any tokens exist in the bank. A token is "withdrawn" for each query sent. The query is blocked if no tokens exist. This is a relatively flexible and effective control. However, the control levels in a token-based scheme are restricted to integral numbers of tokens in the smallest time period allowed. The inventive space chattering scheme can be used to obtain intermediate control levels by assigning different token rates to different traffic sources at the same time.

A variety of known control mechanisms may exist at different traffic sources in the network. For example, the 5ESS, DMS and 4ESS type switches serve as traffic sources for the Segmentation Directory (SD) server in the AT&T network, for example. The 5ESS and the DMS type switches use industry standard call gapping and 4ESS type switches use RBC. The inventive space chattering scheme supports these types of traffic sources. A control value at the SD will be translated into both call gapping and RBC control parameters to obtain an effective control. It is understood that the inventive space chattering mechanism can readily support other types of traffic sources having associated control levels.

As shown in FIG. 1, a network 100 includes a server 102 receiving requests from a first plurality of traffic sources $TS_{A1}$–$TS_{An}$ (class A) and a second plurality of traffic sources $TS_{B1}$–$TS_{Bm}$ (class B). The first plurality of traffic sources $TS_A$ have a first control mechanism of a first type and the second plurality of traffic sources $TS_B$ have a second control mechanism of a second type. In an exemplary embodiment, the first and second types of control mechanisms are different.

While the invention is shown with traffic sources (class A, B) having first and second types of control, it is understood that any number of types of control can be used without departing from the present invention.

In an exemplary embodiment, the traffic of interest may be the total query traffic T received by the server 102. Alternatively, the traffic of interest can be some subset of the total traffic. For example, the scope of the control may be only the traffic received by a single dialed number. The inventive overload control mechanism is adaptive in that it can be used to limit the specified subset of query traffic received by the server to within desired levels, e.g., a range $(T_{low}, T_{high})$.

In one embodiment, the total traffic T to the server 102 is monitored in each time period known as the control interval, and in response, a multiplicity of control level messages in the appropriate format for the class of traffic source are sent to the traffic sources at the end of each control interval or as necessary. In addition, the control mechanism can require that no traffic source should receive a disproportionate share of the control, according to a given criterion of fairness.

Consider a server that receives traffic from a total of N traffic sources (TS). The traffic to be considered can be a subset of the total traffic with given attributes. The traffic sources can be divided into K control classes, each class k with a different control mechanism and a known number $n_k$ of traffic sources in the class, where $N=n_1+n_2+\ldots+n_K$. The control mechanism for class k has the following general attributes.

The control mechanism results in a traffic response that is essentially monotone and continuous with respect to the control level. A set of discrete control levels $\{c_{k1}, c_{k2}, \ldots c_{km}\}$ in a set $C_k$ are available at each traffic source in class k. The controls $\{c_{k1}, c_{k2}, \ldots c_{km}\}$ are arranged in the order of increasing intensity. That is, the application of control $c_{k2}$ at a given traffic source results in less traffic out of the source than that with $c_{k1}$, and so on. It is understood that $(c_k)^+$ denotes the next higher sequential control to $c_k$ in the set $C_k$. For instance, $c_{k6}=(c_{k5})^+$.

The range of the controls in the set $C_k$ is such that for each overload episode that needs to be controlled, there exists an ideal control value $v_k$ in the range of $C_k$ with the following property. The application of $v_k$, for $k=1, 2, \ldots, K$ will result in bringing the total traffic to the server in the desired range $(T_{low}, T_{high})$. Generally, the ideal control value $v_k$ will not correspond exactly to an available discrete value in the set $C_k$, but will fall in the range $(c_{k1}, c_{k(i+1)})$ for some level i. However, the traffic sources in class k can be partitioned into two subsets such that the application of control $c_{ki}$ to one subset and that of the control $(c_{ki})^+$ to the other will have the same effect as applying the ideal control $v_k$ to the entire class k. In one embodiment, a chattering vector is used to apportion the traffic sources to the two or more subsets. For any overload episode that needs to be controlled, a system-wide ideal control driver v can be computed. In addition, the ideal control driver v can be mapped into the base control levels $v_k$ for each class k for an effective control.

For example, the total amount of the excess query traffic received at the server in a control interval may be used to compute the desired change in the ideal "average" control level sent to each traffic source in the next control interval. This ideal level may then be interpreted for each class. For example, a 25% excess query load may be translated to the "ideal" control of an average "25% load reduction" at all traffic sources. This may trigger a change in the ideal gap level from 1 second to 1.33 seconds for one traffic class with call gapping as the control mechanism, and a change in the ideal proportional control level from 50% to 60% for another traffic class with proportional control as the control mechanism.

The total query traffic T is monitored in each control interval. The control can be in states ON or OFF in a control interval. Control entry and exit criteria are defined as conditions under which the control is initiated and terminated, respectively. For example, traffic thresholds $T_{entry}$ and $T_{exit}$, and a number of intervals $M_{entry}$ and $M_{exit}$ may be used to define these criteria as follows:

Entry Criterion: {Current control state is OFF and $T>T_{entry}$ for the last $M_{entry}$ intervals}

Exit Criterion: {Current control state is ON, $T<T_{exit}$ and no controls have been active for the last $M_{exit}$ intervals}

Generally, a hysteresis condition such as $T_{entry}>T_{high}$, and $T_{exit}<T_{low}$ is imposed in order to avoid frequent activation and deactivation of the control. Further entry and exit criterion will be known to one of ordinary skill in the art.

Figure 2:
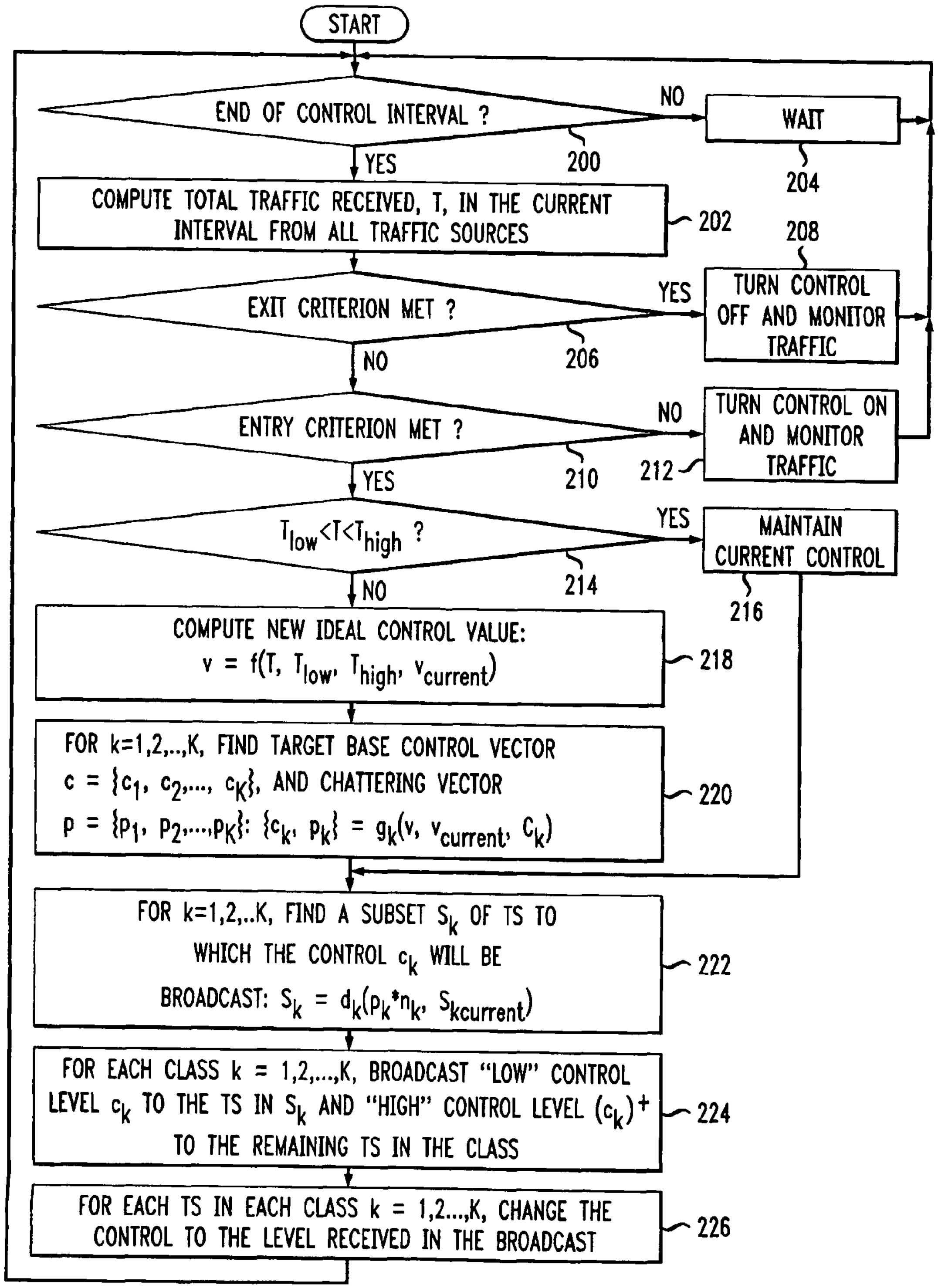
FIG. 2 is a flow diagram showing an exemplary implementation of network overload control in accordance with the present invention.

FIG. 2 shows an exemplary sequence of steps for implementing an overload control mechanism in accordance with the present invention. In step 200, it is determined whether the end of a control interval (the current interval) has been reached. If so, in step 202, the total query traffic T from all the traffic sources in the interval is measured. If not, in step 204 the mechanism waits for a predetermined amount of time and again determines whether the control interval has ended in step 202.

In step 206, it is determined whether the exit criterion has been met. In an exemplary embodiment, let $v_{current}$ be the ideal control driver in the current interval. If the exit criterion was met, and the current ideal control drive $v_{current}=0$, in step 208 the control is turned OFF and traffic is monitored. In step 210, it is determined whether the entry criterion has been met. If it is not met, the traffic is monitored again in step 212.

If in step 210, the entry criterion is met, then in step 214, it is determined whether the traffic level is within a desired range, e.g., whether $T_{low}<T<T_{high}$. If so, the current control status is maintained in step 216. If not, in step 218 a new ideal control driver v is computed. In one embodiment, the control driver is computed using a function f with arguments T, $T_{low}$, $T_{high}$, $v_{current}$, i.e., $v=f(T, T_{low}, T_{high, vcurrent})$. In step 220, a target base control vector $c=\{c_1, c_2, \ldots, c_k\}$ is determined based upon the control levels available for the traffic source classes and the corresponding chattering vector $p=\{p_1, p_2, \ldots, p_K\}$ is computed using a vector of functions $g=\{g_1, g_2, \ldots, g_K)$, each with arguments appropriate for the control mechanism for its class, e.g., $\{c_k, p_k\}=g_k(v, v_{current}, C_k)$.

For each class k=1, 2, . . . , K, in step 222 a subset $S_k$ of traffic sources is found to which the control $c_k$ will be broadcast using a distribution function $d_k$ with arguments $P_k*n_k$ and other relevant factors, such as the subset $S_{kcurrent}$ of traffic sources to receive the control level $c_k$ in the current time interval, e.g., $S_k=d_k(p_k*n_k, S_{kcurrent})$. In step 224, for each class k=1, 2, . . . , K, the server broadcasts the base control level $c_k$ known as the "low" level, to the traffic sources in subset $S_k$ of class k, and the next sequential control level $(c_k)^+$, known as the "high" level, to the remaining $(1-p_k)*n_k$ sources in the class k.

In step 226, for each class k=1, 2, . . . ,K, each traffic source changes its control level to the value received in the broadcast, including turning the control ON or OFF, if so indicated.

In implementing the inventive control mechanism, it is understood that the degree to which server throughput is maximized and traffic equitably distributed depends upon the selection of various functions and parameter settings. The control interval, propagation delays for broadcast, the entry and exit criteria, and the functions f and g determine how quickly the total traffic received by the server is brought to, and maintained within the allowable range $(T_{low}, T_{high})$. For example, the ideal control driver v can represent the "average" traffic that should ideally be received from each traffic source in order to maintain T within the allowable range. In this case, the function f becomes a "correction" function, and could take the form: $v=f(.)=v_{current}*(T_{high}/T)$ if $T>T_{high}$, and $v=f(.)=v_{current}*(T_{low}/T)$ if $T<T_{low}$. The function $g_k$ (.), defined component-wise as $(g^c_k(.),g^p_k(.))$, will depend on the control mechanism for class k. For instance, for call gapping control, $c_k=g^c_k(.)=[1/v]^*$, where $[x]^*$, represents the largest gap available for class k that is smaller than or equal to x, and $p_k=g^p_k(.)=c_k(VC_{k+1}-1)/(c_{k+1}-c_k)$. The distribution function d determines the relative strength of the control applied to different traffic sources.

EXAMPLE

Referring again to FIG. 1, consider a network with a number n of a first class A of traffic sources $TS_{A1}-TS_{An}$ and a number m of a second class of traffic sources $TS_{B1}-TS_{Bm}$. The first class A traffic sources use call gapping control with sixteen ANSI standard gaps and the second class B traffic sources use proportional control with nine blocking levels, ranging from 0 to 100%, in increments of 12.5% (eighths). Let the ideal control driver v be defined as the ratio of the excess query load over the desired target to the total number of queries received. The following steps, with defined entry and exit criterion, illustrate one realization of the space chattering control mechanism of the present invention.

Entry Criterion: {Current control state is OFF and $T>T_{entry}$ for the last $M_{entry}=2$ intervals}

Exit Criterion: (Current control state is ON, $T<T_{exit}$ and no controls have been active for the last $M_{exit}=3$ intervals}

Initialize the control at the beginning of the first interval by setting all control levels to OFF and let $v_{current}$, the ideal control driver value be set at value 0.

S1. At the end of the current interval, measure the total query traffic T from all the traffic sources in classes A and B in the interval. Let $v_{current}$ be the ideal control driver value in the current interval.

A. If $v_{current}=0$, and the Exit Criterion passes, turn the control OFF and go to S1.

B. If $v_{current}=0$, and the Entry Criterion passes, turn the control ON and go to S2

C. If the conditions in steps A and B do not apply, go to S2.

S2. If $T_{low}<T<T_{high}$, maintain the current control status and go to S1. Otherwise, compute a new ideal control driver value:

$$v=(T-T_{high})/T \text{ if } T>T_{high}, \text{ and } v=(T_{low}-T)/T \text{ if } T<T_{low},$$

and go to S3.

S3. Find target base control vector $c=\{c_A, c_B\}$, and the corresponding chattering vector $p=\{p_A, p_B\}$ using a vector of functions $g=\{g_A, g_B\}$:

$$\{c_A, p_A\}=g_A(v, c_{Acurrent}, C_A),$$

where the function $g_A$ computes the next gap and chattering levels $\{c_A, p_A\}$ for class A traffic sources using the standard automatic call gapping (ACG) algorithm, for example. The function $g_B$ for the class B traffic sources is defined as follows: Let $T_{target}=(T_{high}+T_{low})/2$, and $c_{Bold}$ be the current base control level. Then, $$c_B=[c_{Bold}*T_{target}/T]^*,$$

where=$[x]^*$ is the largest fractional control level available that is less than x. The available fractions range from 0 to 1.0, in increments of 0.125 (⅛). For example, $[0.16]^*=0.125$. The chattering level can be computed as, $$p_B=(c_B+0.125-c_{Bold}*T_{target}/T)/0.125$$

It will be seen that the chattering level p biases the subset distribution based upon the overload condition. The fraction $p_B$ can take values between 0 (when $c_B=c_{Bold}*T_{target}/T-0.125$) and 1.0 (when $c_B=c_{Bold}*T_{target}/T$) depending upon the relative position of the ideal control fraction $c_{Bold}*T_{target}/T$ in the adjacent available control levels. For instance, a value of the fraction $c_{Bold}*T_{target}/T$ close to the "low" control level $[c_{Bold}*T_{target}/T]^*$ will cause a majority of the sources to be controlled at the "low" level.

S4. For each class k=A, B, find a subset $S_k=p_k*n_k$ of traffic sources to which the "low" control $c_k$ will be broadcast.

S5. For each class k=A, B, broadcast the base control levels $c_{Ak}$, $c_{Bk}$ known as the "low" level, to the traffic sources in a first subset $S_{k1}$ of class k, and the next sequential control level $(c_k)^+$, known as the "high" level, to the remaining $(1-p_k)*n_k$ sources $S_{k2}$ in the class k. A so-called round robin marking scheme can be used to "fairly" distribute the "high" and "low" controls among traffic sources in the same class. Go back to S1.

It is understood that the terms "function" and "vector" are used herein as an exemplary implementation and should be construed broadly to cover various mathematical tools that can be used to provide substantially the same result. It is further understood that the terms "server" and "traffic source" should also be construed broadly to cover a wide range of devices that interact with other devices in various types of networks.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A network having overload control for handling an overload condition involving at least a first plurality of traffic sources operating according to a first traffic control mechanism and a second plurality of traffic sources operating according to a second traffic control mechanism, the network comprising a server configured to broadcast, upon detection of the overload condition:

a first control value to a first subset of the first plurality of traffic sources and a second control value to a second subset of the first plurality of traffic sources, so as to achieve a degree of traffic control intermediate between discrete degrees of traffic control that would be achieved by separate use of the first and second control values in the first traffic control mechanism, and a third control value to a first subset of the second plurality of traffic sources and a fourth control value to a second subset of the second plurality of traffic sources, so as to achieve a degree of traffic control intermediate between discrete degrees of traffic control that would be achieved by separate use of the third and fourth control values in the second traffic control mechanism.

2. The network according to claim 1, wherein the first traffic control mechanism is one of a group consisting of:

call gapping control, proportional control, and rate based control traffic control.

3. The network according to claim 1, wherein the server corresponds to a segmentation directory server.

4. The network according to claim 1, wherein the first plurality of traffic sources are associated with telephone calls.

5. The network according to claim 1, wherein the first and second control values correspond to discrete values for the first traffic control mechanism.

6. The network according to claim 5, wherein the first and second control values together provide an ideal control value for the first plurality of traffic sources to bring a traffic level within a desired range.

7. A server comprising an overload control mechanism for handling an overload condition involving at least a first plurality of traffic sources operating according to a first traffic control mechanism and a second plurality of traffic sources operating according to a second traffic control mechanism, the overload control mechanism configured to broadcast, upon detection of the overload condition:

a first control value to a first subset of the first plurality of traffic sources and a second control value to a second subset of the first plurality of traffic sources, so as to achieve a degree of traffic control intermediate between discrete degrees of traffic control that would be achieved by separate use of the first and second control values in the first traffic control mechanism, and a third control value to a first subset of the second plurality of traffic sources, and a fourth control value to a second subset of the second plurality of traffic sources, so as to achieve a degree of traffic control intermediate between discrete degrees of traffic control that would be achieved by separate use of the third and fourth control values in the second traffic control mechanism.

* * * * *